(12) United States Patent
Otsuka et al.

(10) Patent No.: US 8,095,695 B2
(45) Date of Patent: Jan. 10, 2012

(54) CONTROL APPARATUS FOR PROCESS INPUT-OUTPUT DEVICE

(75) Inventors: Yusaku Otsuka, Hitachiota (JP); Naoya Mashiko, Hitachiota (JP); Shin Kokura, Hitachi (JP); Yu Iwasaki, Hitachi (JP); Ryuichi Murakawa, Hitachi (JP); Akira Bando, Hitachi (JP); Wataru Sasaki, Hitachiota (JP); Hideyuki Yoshikawa, Funabashi (JP); Masamitsu Kobayashi, Hitachi (JP)

(73) Assignees: Hitachi, Ltd., Tokyo (JP); Hitachi Information & Control Solutions, Ltd., Ibaraki (JP); Hitachi Engineering & Services Co., Ltd., Ibaraki (JP)

( * ) Notice: Subject to any disclaimer, the term of this patent is extended or adjusted under 35 U.S.C. 154(b) by 181 days.

(21) Appl. No.: 12/358,375

(22) Filed: Jan. 23, 2009

(65) Prior Publication Data
US 2009/0187261 A1 Jul. 23, 2009

(30) Foreign Application Priority Data
Jan. 23, 2008 (JP) ................................ 2008-012935

(51) Int. Cl.
*G06F 3/00* (2006.01)

(52) U.S. Cl. ..................... 710/7; 710/5; 710/45; 710/58; 710/59; 718/102; 718/103; 718/107; 718/108

(58) Field of Classification Search .................. None
See application file for complete search history.

(56) References Cited

U.S. PATENT DOCUMENTS

| 6,754,576 B2* | 6/2004 | Nishimura | 701/102 |
| 2008/0016509 A1* | 1/2008 | Kamiya et al. | 718/103 |

FOREIGN PATENT DOCUMENTS

| JP | A-2001-56781 | 2/2001 |
| JP | 2003-067201 | 3/2003 |
| JP | A-2003-248593 | 9/2003 |
| JP | A-2007-193744 | 8/2007 |

OTHER PUBLICATIONS

Ludemann, C.A., "A Microprocessor Multi-Task Monitor", Oct. 1983, IEEE Transactions on Nuclear Science, pp. 1-6.*
Hoffman et al., "Task Timing Apparatus", Oct. 1980, IP.com, pp. 1-8.*
Japanese Office Action issued on Jul. 5, 2011; Application No. 2008-012935.

* cited by examiner

*Primary Examiner* — Eron J Sorrell
(74) *Attorney, Agent, or Firm* — Antonelli, Terry, Stout & Kraus, LLP.

(57) ABSTRACT

A control apparatus for an input-output device includes a hardware part and a software part, in which a controller in the hardware part carries out a control operation in accordance with a signal from the input-output device, outputs a result of the control operation to a process, and has a timer unit to be excited at a constant period; and the software part has an information process part, a control process part, and an interrupt control unit to switch over the information process part and control process part one another, in which the interrupt control unit suspends an execution of the information process part to execute the control process part in priority and resume the information process part by switching over to the information process part from the control process part, when the execution of the control process part is terminated.

19 Claims, 11 Drawing Sheets

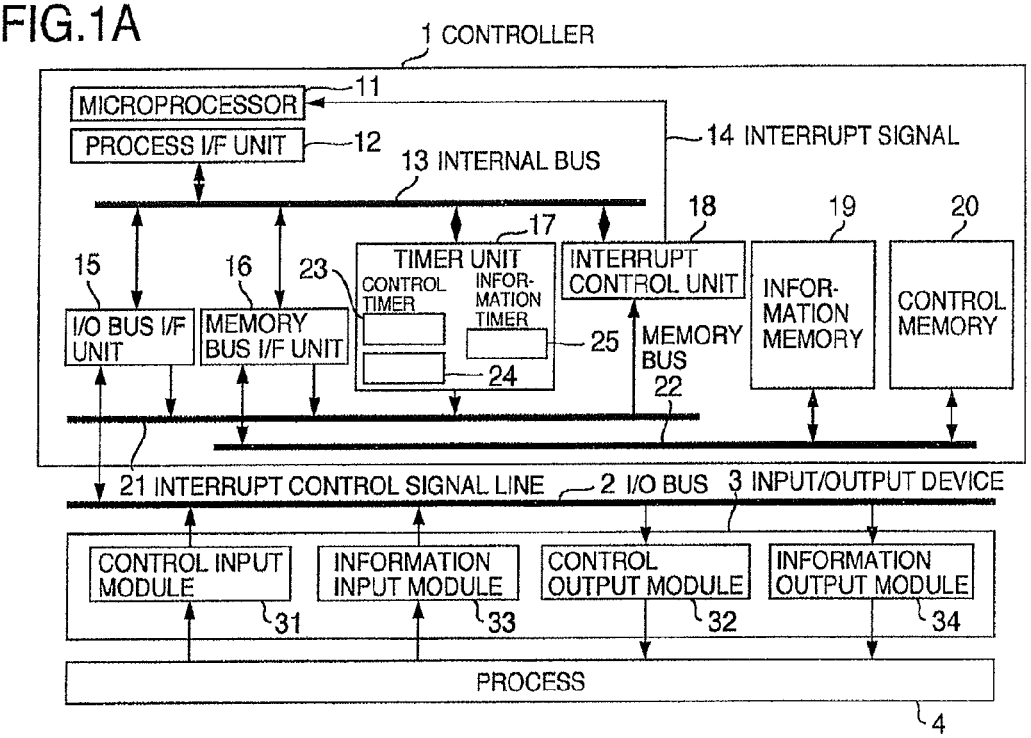
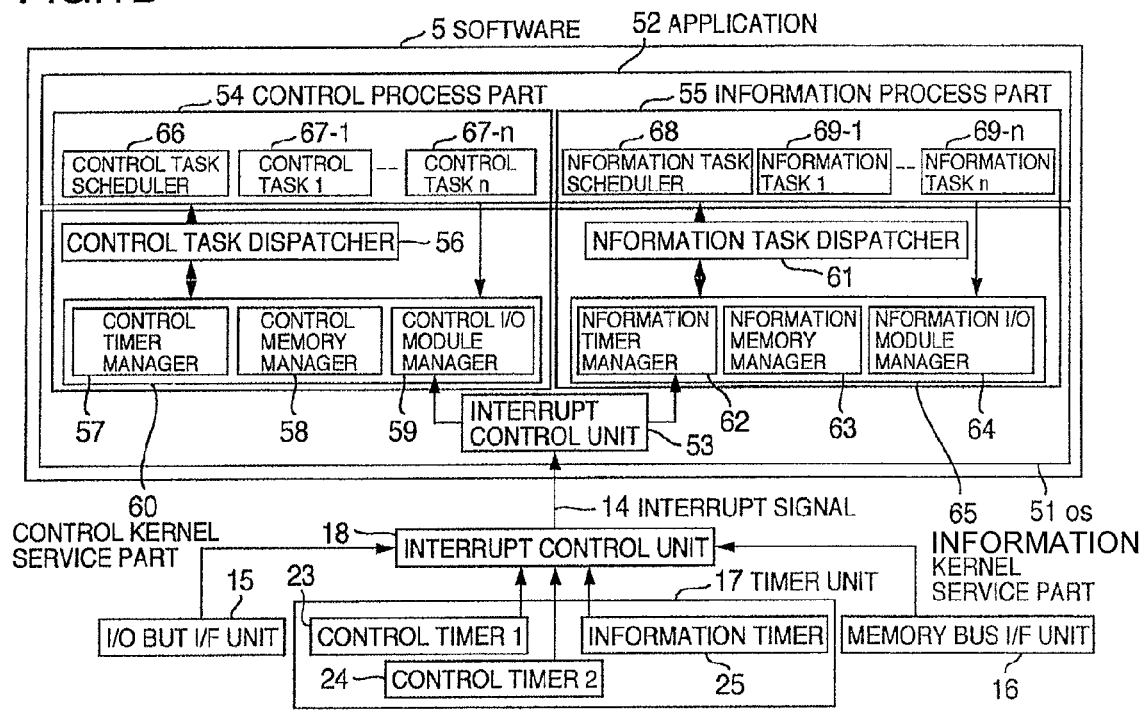

STATE TRANSITION DIAGRAM OF SOFTWARE

FLOWCHART SHOWING PROCESSING SEQUENCE IN SOFTWARE ON INTERRUPT OCCURRENCE OF CONTROL TIMER 24

FLOWCHART SHOWING A PROCESSING SEQUENCE IN SOFTWARE ON INTERRUPT OCCURRENCE OF CONTROL TIMER 23

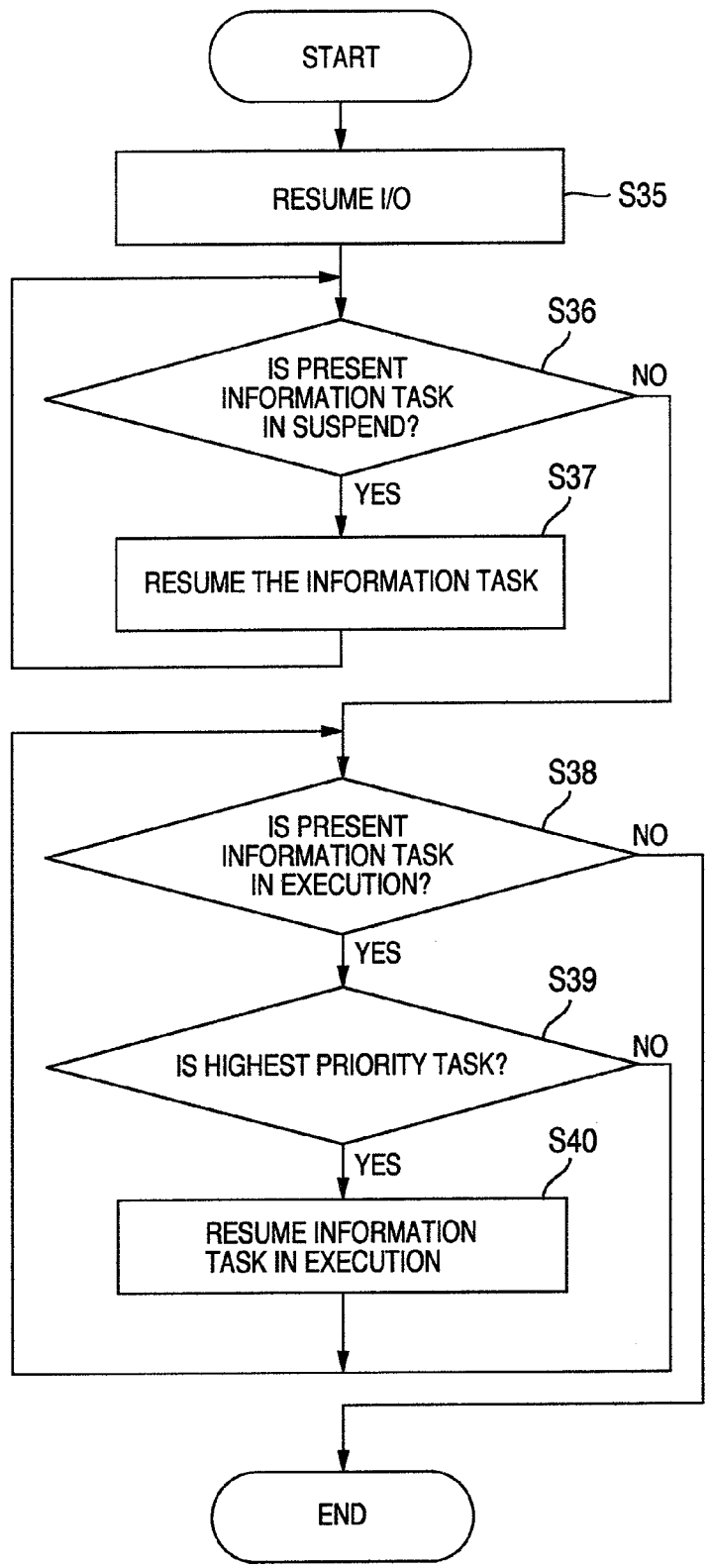
FLOWCHART SHOWING A PROCESSING SEQUENCE IN SOFTWARE ON PROCEEDING CONTROL PROCESS PART 54 TO INFORMATION PROCESS PART 55

STATE TRANSITION DIAGRAM OF SOFTWARE

FLOWCHART SHOWING A PROCESSING SEQUENCE IN SOFTWARE ON PROCEEDING INFORMATION PROCESS PART 55 TO CONTROL PROCESS PART 54

CONTROL APPARATUS FOR PROCESS INPUT-OUTPUT DEVICE

BACKGROUND OF THE INVENTION

The present invention relates to a control apparatus to control an input and output to/from a process, and particularly to a control apparatus that requires an accurately controlled period.

In the past, a control apparatus has been required to mount with a control operating system to realize the accurately controlled period. To this end, this control apparatus has provided a simplicity of scheduling, such as a suppression for an interrupt from an external device and a prohibition for a preemption, so that the control apparatus has carried out to control such that a protection from time pressure relative to tasks, such as a control period, is first prioritized.

The preemption is a function and means that a priority is set to the task to dynamically switch over execution sequences of the task. That is, this function is that the task presently in execution is halted to then execute a high priority task in first, when the high priority task becomes executable.

However, it is not necessary to operate all of the controls by an accurate period, and the control is frequently used with a low priority control, a slow control used for chemical plants, a communication control, and an event-driven control.

The event-driven control is used for supporting an event caused by the interrupt from the external devices, such as network devices, and also supporting a preemptive multitask etc. In this case, the control apparatus mounting with an information operating system is therefore used for such that it is adapted to a task having a low time pressure.

In the case of practically operated process controls, there have been installed with two types of the control apparatus: a control apparatus mounting with a control operating system; and a control apparatus mounting with the information operating system.

In addition, JP-A-2003-67201 has proposed a technique to manage such that a plurality of tasks are divided into a communication task group, a control task group, and a management task group that manages the foregoing groups. In the case of this technique, the execution sequence for the plurality of tasks is switched over for every group thereof, and CPU (Central Processing Unit) then executes a process of either information acquired from LAN (Local Area Network) or information acquired from devices, in accordance with the tasks that are switched over.

SUMMARY OF THE INVENTION

However, according to the foregoing related technique, there must be installed the two types of control apparatus: the control apparatus that requires the accurately controlled period; and the control apparatus that controls other pieces of information.

In addition, the two systems as the control operating system and information operating system must also be prepared for a programming environment, a debag environment, etc.

For this reason, two hardware constitutions are prepared for both the control and the information, likewise, two software constitutions are also prepared for the control and the information. Therefore, the useless constitutions have resided, even though the two constitutions for the control and information are not used simultaneously.

In addition, in the case of the technique disclosed in JP-A-2003-67201, there has been a disadvantage such that the task cannot be switched over on the way of executing the group, even though the execution sequence for the plurality of tasks is switched over at every group.

An object of the invention is to provide a control apparatus that satisfies both a control for requiring an accurately controlled period and a control for information such as for other communications, on a commonly used control apparatus.

The control apparatus in the invention includes the following hardware part having process input-output devices for receiving input signals from a process that requests a processing and outputting control signals to the process.

Further, the hardware part includes a controller that carries out a control operation in accordance with the output signal from the process input-output device to output a result of the control operation to the process via the process input-output device, and the controller also has a switchover timer unit to be excited in a constant period. Furthermore, the hardware part includes an I/O bus to be connected between the process input-output device and the controller, as a communication path for the control signal and data to be transmitted between them.

The control apparatus in the invention also includes a software part to be executed in the controller. This software part includes an information process part that executes an information processing, a control process part that executes a control processing, and an operation mode switchover part that switches over the information process part and the control process part.

Here, the operation mode switchover part switches over the information process part and the control process part such that an execution of the information process part is suspended to then execute the control process part in priority at every excitation of the switchover timer unit, and the execution of the information process part is resumed when the execution of the control process part is terminated.

In the invention, the control process part is added to the information process part in the software part to execute a control task at an accurately controlled period given by the switchover timer unit provided in the controller of the hardware part. In this way, a low cost and effective control apparatus can be realized on the commonly used control apparatus and also a commonly used programming environment.

According to the invention, a control task of the control process part that requires the accurately controlled period can be executed together with an information task, such as communications, of the information process part by a commonly used sequence on the commonly used control apparatus. Further, the control task and the information task are switched over one another by a time-sharing method on the commonly used control apparatus, therefore, there is an advantage such that the processing can be executed as if two control apparatuses are resided virtually.

According to the invention, the control task of the control process part that requires the accurately controlled period is executed in priority, and the information task, such as communications, of the information process part can be executed at a remaining time. In addition, it is possible to ensure that the operation mode switchover part switches over the control task in the control process part and the information task in the information process part on the commonly used control apparatus.

According to the invention, there is also an advantage such that an interference between an operation of control task in the control process part that requires the accurately controlled period and an operation of the information task, such as communications, in the information process part, can be avoided by a control task scheduler and an information task scheduler.

The other objects, features and advantages of the invention will become apparent from the following description of the embodiments of the invention taken in conjunction with the accompanying drawings.

BRIEF DESCRIPTION OF THE DRAWINGS

FIG. 1A is a hardware constitutional diagram showing a control apparatus in a first embodiment of the invention;

FIG. 1B is a software constitutional diagram showing the control apparatus in the first embodiment of the invention;

FIG. 7 is a flowchart showing a processing sequence on proceeding from the control process part 54 to the information process part 55 in the software 5;

DESCRIPTION OF THE EMBODIMENTS

Figure 2:
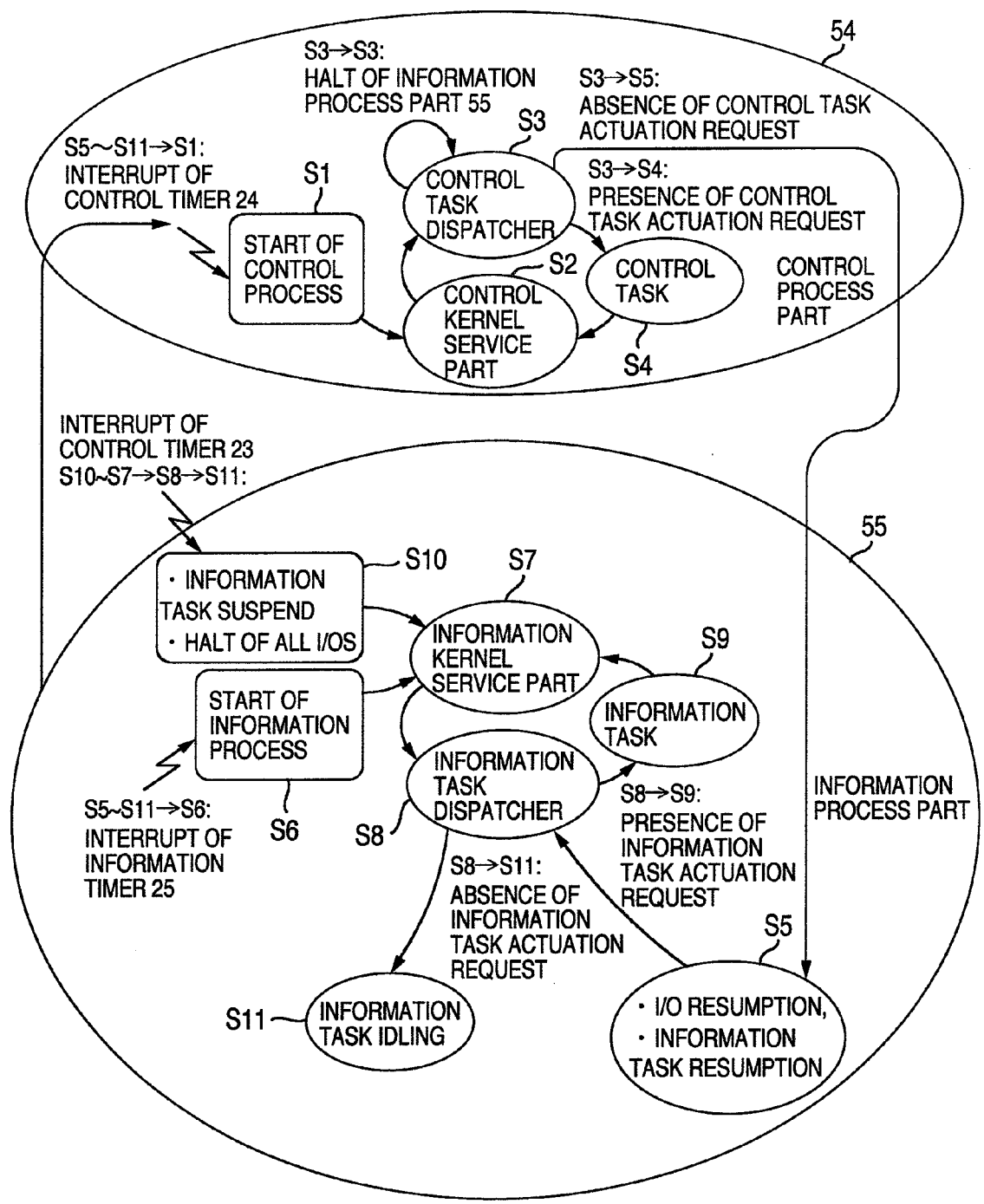
FIG. 2 is a state transition diagram showing the software on the control apparatus in the first embodiment of the invention.

Hereinafter, embodiments of the invention will be described with reference to FIGS. 1 to 11.

Embodiment 1

A first embodiment will be described with reference to FIG. 1A showing a hardware constitution and FIG. 1B showing a software constitution of the control apparatus in the invention.

The hardware constitution of the control apparatus in FIG. 1A includes a process (plant) 4 that requests a processing, a process input-output device 3, a controller 1 that controls an input and output of the process 4, and an I/O bus 2 connected between the process input-output device 3 and the controller 1.

The process input-output device 3 is connected with the process 4 to receive signals from the process 4 and to output control signals to the process 4.

The controller 1 includes a microprocessor 11, an internal bus 13, a timer unit 17 to be excited by a constant period, an interrupt control unit 18 that transmits an excitation signal from the timer unit 17 to the processor 4 as an interrupt, an information memory 19, and a control memory 20.

The controller 1 also includes a memory bus 22 connected between the information memory 19 and the control memory 20, and a memory bus interface unit 16 connected with the internal bus 13, the information memory 19 and the control memory 20 via the memory bus 22.

The controller 1 further includes a processor interface unit 12 connected between the microprocessor 11 and the internal bus 13, and a I/O bus interface unit 15 connected between the internal bus 13 and the I/O bus 2.

Here, the timer unit 17 includes control timers 23 and 24, and an information timer 25. The respective timers 23, 24 and 25 are excited by elapsing a predetermined time to notify a timer excitation to the interrupt control unit 18 via an interrupt control signal line 21.

The interrupt control unit 18 then generates an interrupt signal 14 to be interrupted to the microprocessor 11. In the case of this embodiment, an interrupt priority of the interrupt control unit 18 is set to a descending order of the control timer 24, the control timer 23, and the information timer 25.

In the case of this embodiment, the bus constitution has been described separately with use of the internal bus 13, memory bus 22, and I/O bus 2. However, this constitution may be selected from such that a single bus group is appropriately separated by using a normally used technique.

Further, in the case of this embodiment, the information memory 19 has been described separately from the control memory 20. However, such constitution is not limited to the invention, but may be selected from such that a single memory group is appropriately separated by using a normally used technique.

Furthermore, in the case of this embodiment, the type of the I/O bus 2, internal bus 13, interrupt control signal line 21 and memory bus 22, has not been described clearly with which of the bus is used by a serial bus or a parallel bus. However, either the serial or parallel bus may be selected appropriately by using a normally used technique.

The process input-output device 3 is constituted by a control input module 31, a control output module 32, an information input module 33, and an information output module 34.

In the case of the invention, the respective input modules 31, 33 and output modules 32, 34 have been described separately with the information and the control, and also the input and output. However, such constitution is not limited to the invention, but the information input/output and control input/output may be selected appropriately by using a normally used technique.

Next, referring to FIG. 1B, a software 5 to be executed in the controller 1 is constituted by an OS (Operating System) 51 and an application 52 to be operated by the OS 51. The software 5 is constituted by a control process part 54, an information process part 55, and an interrupt control unit 53.

The control process part 54 and information process part 55 are function parts to be executed by the application 52. The interrupt control unit 53 is also a function part to be executed by the OS 51.

The control process part 54 is constituted by a control task scheduler 66 as a control application task, a control task 67-1 to a control task 67-n, a control task dispatcher 56, and a control kernel service part 60.

The control task scheduler 66 applies a trigger to actuate the control tasks 67-1 to 67-n, and makes a schedule such that the tasks are executed sequentially without interrupting from another process of an after-mentioned information task in execution of the control tasks 67-1 to 67-n.

The control kernel service part 60 is constituted by a control timer manager 57 to manage the control timer 23, a control memory manager 58 to manage the control memory 20, and a control I/O module manager 59 to manage the control input module 31 and the control output module 32.

In the case of this embodiment, the control process part 54 prohibits a preemption among the control tasks 67-1 to 67-n. In this way, it is attempted that an overhead is reduced by causing of a switchover among the control tasks 67-1 to 67-n, and a deviation of control period of each of the control tasks 67-1 to 67-n is reduced.

Here, the control task dispatcher 56 executes to prohibit the preemption. That is, the control task dispatcher 56 sets the control tasks 67-1 to 67-n to a single priority under a default state.

In this way, an interrupt cannot be applied to among the control tasks 67-1 to 67-n, so that the execution of the task in accordance with the priority can be eliminated, and a queuing time of the task execution can also be eliminated.

Further, the interrupt control unit 53 masks the interrupt of the after-mentioned information task to permit the interrupt of the control tasks 67-1 to 67-n alone, contrary to the information task.

Further, the control task dispatcher 56 prohibits the interrupt from the I/O bus interface unit 15, the memory bus interface unit 16, the timer unit 17, and other hardware components to thereby restrain a suspend of executing the control tasks 67-1 to 67-n caused by an interrupt processing.

The information process part 55 is constituted by an information task scheduler 68 as an information application task, an information task 69-1 to an information task 69-n, an information task dispatcher 61, and an information kernel service part 65.

The information kernel service part 65 is constituted by an information timer manager 62 to manage the control timer 24 and information timer 25, an information memory manager 63 to manage the information memory 19, and an information I/O module manager 64 to manage an information input module 33 and an information output module 34.

In the case of this embodiment, the information process part 55 is constituted to use the information memory 19, information input module 33, and information output module 34. Further, the information process part 54 is constituted to use the control memory 20, control input module 31, and control output module 32.

Therefore, a conflict does not occur between the information process part 55 and control process part 54, and an effect is not given to one another. In this way, the application 52 and OS 51 are provided in the software 5, and the application 52 and OS 51 have an information part or the information process part 55 and a control part or the control process part 54, respectively. Further, input and output modules or the control input module 31 and control output module 32 and the information input module 33 and information output module 34 are constituted separately to thereby divide resources. Because of this, an access cannot be carried out simultaneously to the information memory 19 and control memory 20, so that the effect cannot be given to the processing concerned with the information process part 55 and control process part 54.

The information process part 55 permits the interrupt from the I/O bus interface unit 15, memory bus interface unit 16, time unit 17, and other hardware components to support an event process caused by the interrupt from an external device.

The information application tasks can be adapted to the preemption, that is, high priority information tasks 69-1 to 69-n interrupt to the same or low priority information tasks 69-1 to 69-n to be able to carry out the processing.

That is, the information timer manager 62 notifies an interrupt timing to the information task dispatcher 61, and the information task dispatcher 61 compares priority levels of the information tasks 69-1 to 69-n to carry out an interrupt process in response to the priority.

Here, the information task dispatcher 61 sets the priority of the information tasks 69-1 to 69-n under the default state.

A reason why the interrupt can be executed among the information tasks 69-1 to 69-n is that a normal interrupt process is allowed to execute, since the information tasks 69-1 to 69-n are general-purpose tasks.

The software 5 is classified into the OS 51 to be operated at a supervisory mode and the application 52 to be operated at a user mode in the case where it is classified as a point of view from an operation mode of the microprocessor 11. The supervisory mode of OS 51 is separated from the application 52 having a high priority in the user mode.

The OS 51 is constituted by the control task dispatcher 56 and control kernel service part 60 both belonging to the control process part 54, the information task dispatcher 61 and information kernel service part 65 both belonging to the information process part 55, and the interrupt control unit 53.

The application 52 is constituted by the control task scheduler 66 and control tasks 67-1 to 67-n both belonging to the control process part 54, and the information task scheduler 68 and control tasks 69-1 to 69-n both belonging to the information process part 55.

Next, a switchover operation between the control process part 54 and the information process part 55 will be described with use of a state transition diagram shown in FIG. 2, a timing chart shown in FIG. 3, processing flowcharts shown in FIG. 4 to FIG. 7.

Hereinafter, a software execution of the control apparatus in the embodiment of the invention will be described briefly with use of the state transition diagram in FIG. 2.

FIG. 2 shows a state transition of the control process part 54.

Referring to FIG. 2, when an interrupt occurs by causing of the control timer 24, the control process part 54 proceeds to a control process starting state at a step S1. The control process starting state at the step S1 proceeds to the control process part 54 via a process state of the information process part 55, at steps S5 to S11.

An activation process of the control task scheduler 66 shown in FIG. 1B is carried out such that the processing proceeds to a control state of the control task dispatcher 56 at a step S3 via the processing of the control kernel service part 60, at a step S2, from the control process stating state at the step S1. The process state of the control task dispatcher 56 at the step S3 is a halt state of the information process part 55.

When an activation request occurs for the control task scheduler 66, the processing proceeds from the process state of the control task dispatcher 56 at the step S3 to a running state of the control task, at a step S4, adapted to the control application tasks (66, 67-1 to 67-n).

Thereafter, the processing proceeds to three states: the running state of the control kernel service part 60 at the step S2; the running state of the control task dispatcher 56 at the step S3; and the running state of the control application tasks (66, 67-1, 67-2) at the step S4.

Here, the state of the control application tasks (66, 67-1, 67-2) in execution at the step S4 is terminated all. The state of the control process part 54 is then terminated, and the processing proceeds to the information process part 55, when the activation request becomes absent for the control task scheduler 66 shown in FIG. 1.

That is, the processing proceeds to a resuming state for an information I/O in the information process part 55 from the process state of the control task dispatcher 56 in the control process part 54 at the step S3, when the activation request of the control task becomes absent, at a step S5.

The task for the information process part 55 is resumed at the resuming state for the information I/O in the step S5. What the task for the information process part 55 is resumed is that it indicates a resumption process. Here, the resumption process is carried out to resume the task that indicates the suspended process state, at the steps S5 to S11, caused by the interrupt from the control timer 24.

Thereafter, the processing proceeds to three states: the running state of the information kernel service part 65 at a step S7; the running state of the information task dispatcher 61 at a step S8; and the running state of the information task in the information application tasks at a step S9, from the resuming state of the information I/O at the step S5.

When the execution of all of the information application tasks is terminated and the information task dispatcher 61 in FIG. 1B judges that the information application tasks (68, 69-1 to 69-*n*) to be executed are absent, the processing proceeds to an information task idling state at the step S11.

That is, the processing proceeds to the information task idling state from the process state of the information task dispatcher 61 at the step S8, when the activation request of the information task is absent, at the step S11. In addition, the processing proceeds to the running state of the information task in the information application tasks at the step S9 from the process state of the information task dispatcher 61 at the step S8, when the activation request of the information task is present.

After that, when an interrupt occurs by causing of the information timer 25, the interrupt control unit 53 notifies the interrupt to the information process part 55. The information process part 55 then proceeds to the information process starting state at the step S6. The information process starting state at the step S6 indicates a start state of the respective process states, at the steps S5 to S11, of the information process part 55.

In the information process starting state at the step S6, the actuation process is carried out for the information task scheduler 68 shown in FIG. 1B, and a control of the process state proceeds to the information task dispatcher 61 at the step S8. Here, the processing proceeds to the process state of the information task dispatcher 61 at the step S8 from the information process starting state at the step S6 via the process state of the information kernel service part 65 at the step S7.

When the interrupt occurs by causing of the control timer 23, the interrupt control unit 53 shown in FIG. 1 notifies the interrupt to the information process part 55. At this time, the information process part 55 proceeds to an information task suspended state at the step S10. All of the I/Os are the halt state in the information task suspended state.

That is, the control timer 23 acts as a so-called prediction timer, when the interrupt occurs by causing of the control timer 23, thereafter, the interrupt occurs by causing of the control timer 24.

Here, the processing proceeds to the information task idling state at the step S11 from the information task suspended state at the step S10 via the process state of the information kernel service part 65 at the step S7 and the process state of the information task dispatcher 61 at the step S8.

Next, software executions of the timer unit 17, interrupt control unit 53, control process part 54, and information process part 55, will be described with use of a timing chart shown in FIG. 3.

Figure 3:
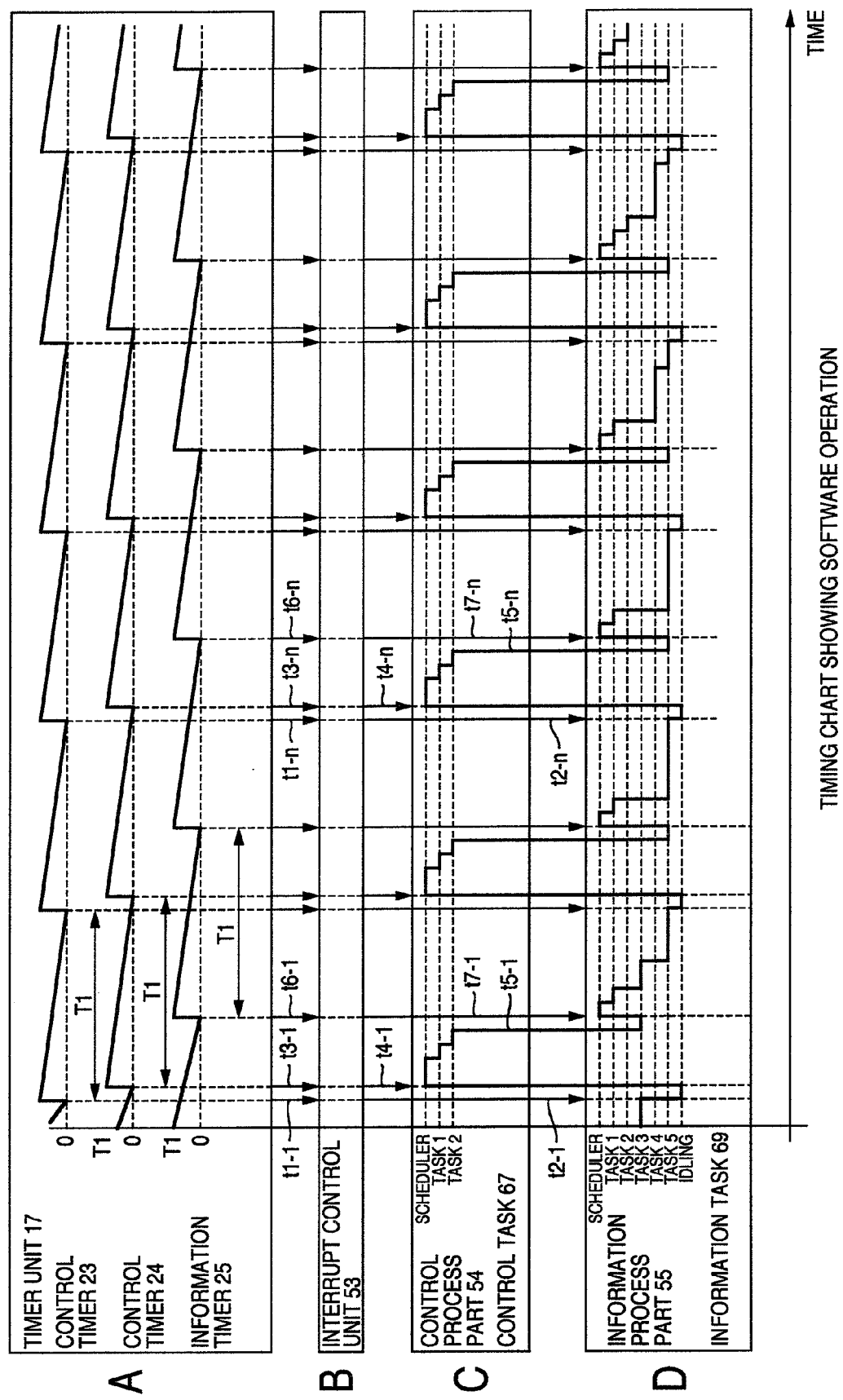
FIG. 3 is a timing chart showing an operation of the software, in which "A" indicates an operation of a timer unit 17, "B" indicates an operation of an interrupt control unit 53, "C" indicates an operation of a control process part 54, and "D" indicates an operation of an information process part 55.

"A" in FIG. 3 indicates a timing chart of the timer unit 17. "B" indicates a timing chart of the interrupt control unit 53. "C" indicates a timing chart of the control process part 54. "D" indicates a timing chart of the information process part 55.

In the case of this embodiment, the control timer 24 in "A" in FIG. 3 has the highest priority, and the control timer 23 has the next high priority. The information timer 25 is set to a lower priority than that of the control timers 23, 24.

A setting time is set to such that the control timer 23, control timer 24 and information timer 25 generate respectively an interrupt at a time interval T1, and the interrupt is generated in sequence from the control timer 23, control timer 24, and information timer 25, as shown in "A" in FIG. 3.

In the case of this embodiment, the control application tasks shown in "C" in FIG. 3 indicate an example of the control task scheduler 66 and two control tasks (67-1, 67-2). All of the control application tasks have the same priority, and the execution is carried out in sequence for the control task scheduler 66, control task 67-1, and control task 67-2.

The information application tasks shown in "D" in FIG. 3 indicates an example of the information task scheduler 68 and five information tasks 69-1 to 69-5. The priority of the information application tasks is descended in sequence to the information task scheduler 68, information task 69-1, information task 69-2, information task 69-3, information task 69-4, and information task 69-5.

The high priority information application task interrupts the low priority information application task to then execute the task. In addition, each of the information tasks 69-1, 69-2, 69-3, 69-4, and 69-5 has an independent actuation period. This actuation period has an integral multiple of the information task scheduler 68.

As shown in "A" of FIG. 3, when the interrupt occurs by causing of the control timer 23 at a time t1-1, the interrupt control unit 53 notifies the interrupt to the information process part 55 at a time t2-1 shown in "B" in FIG. 3.

In this state, the information process part 55 proceeds to the state at the step S10 shown in FIG. 2. In the case of the state at the step S10, the information task indicates the suspended state, and all of the I/Os indicate the halt state.

As shown in "D" in FIG. 3, the interrupt caused by the control timer 24 occurs at a time t3-1 as shown in "A", after the information task 69-3 is suspended at the time t2-1. Here, the interrupt control unit 53 notifies the interrupt to the control process part 54 at a time t4-1. In this state, the control process part 54 proceeds to the control process starting state at the step S1 shown in FIG. 2.

That is, by the interrupt caused by the control timer 24, the control process part 54 executes consecutively the control task scheduler 66 and control tasks 67-1, 67-2 at the time t4-1, as shown in "C" in FIG. 3, and the execution is terminated at a time t5-1.

Thereafter, as shown in "A" in FIG. 3, when the interrupt occurs by causing of the information timer 25 at a time t6-1, the interrupt control unit 53 notifies the interrupt to the information process part 55 at a time t7-1. In this state, the information process part 55 proceeds to the information process starting state at the step S6, as shown in FIG. 2.

As shown in "D" in FIG. 3, an execution is then carried out for the information task scheduler 68 and the information tasks 69-1, 69-3 and 69-5. The execution of all of the information application tasks is terminated, and the processing then proceeds to an idling state. This state indicates the state at the step S11 in FIG. 2.

In the case of this embodiment, the first execution of the information application task is the highest priority information task scheduler 68, as shown in "D" in FIG. 3. The information task scheduler 68 provides a trigger to activate the information tasks 69-1 to 69-n.

As shown in "D" in FIG. 3, the information task scheduler 68 issues the actuation request to the information kernel service part 65 in FIG. 1 for an information task that has adapted to the actuation period among the information tasks 69-1 to 69-5, and this process then terminates.

After terminating the information task scheduler 68, the processing proceeds again to the process state of the information task dispatcher 61 at the step S8, as shown in FIG. 2, and an information task subjected to the actuation request among the information tasks 69-1 to 69-5 is executed.

Thereafter, the software executes similarly to the foregoing operation. As shown in "A" in FIG. 3, when the interrupt occurs by causing of the control timer 23 at a time t1-n, the interrupt control unit 53 notifies the interrupt to the information process part 55 at a time t2-n, as shown in "B".

As shown in "D" in FIG. 3, after the information task 69-5 is suspended at the t2-n, the interrupt caused by the control timer 24 occurs at a time t3-n as shown in "A". Here, the interrupt control unit 53 notifies the interrupt to the control process part 54 at a time t4-n, as shown in "C".

That is, by the interrupt caused by the control timer 24, the control process part 54 executes consecutively the control task scheduler 66 and the control tasks 67-1, 67-2 at the time t4-n, and the execution terminates at a time t5-n, as shown in "C" in FIG. 3.

Thereafter, as shown in "A" in FIG. 3, when the interrupt occurs by causing of the information timer 25 at a time t6-n, the interrupt control unit 53 notifies the interrupt to the information process part 55 at a time t7-n, as shown in "C".

Consequently, the information process part 55 executes the information task scheduler 68 and information tasks 69-1, 69-5, as shown in "D" in FIG. 3, and proceeds to the idling state when the execution of all of the information application tasks is terminated.

After that, the interrupt occurs at an elapse of every T1 by causing of the control timers 23, 24 and information timer 25 as shown in "A" in FIG. 3, the switchover operation is applied repeatedly to the information process part 55 and the control process part 54 as shown in "D" and "C", and the control process part 54 is always executed in priority within the constant period as shown in "C".

Next, processing sequences of the software will be described with use of flowcharts.

Figure 4:
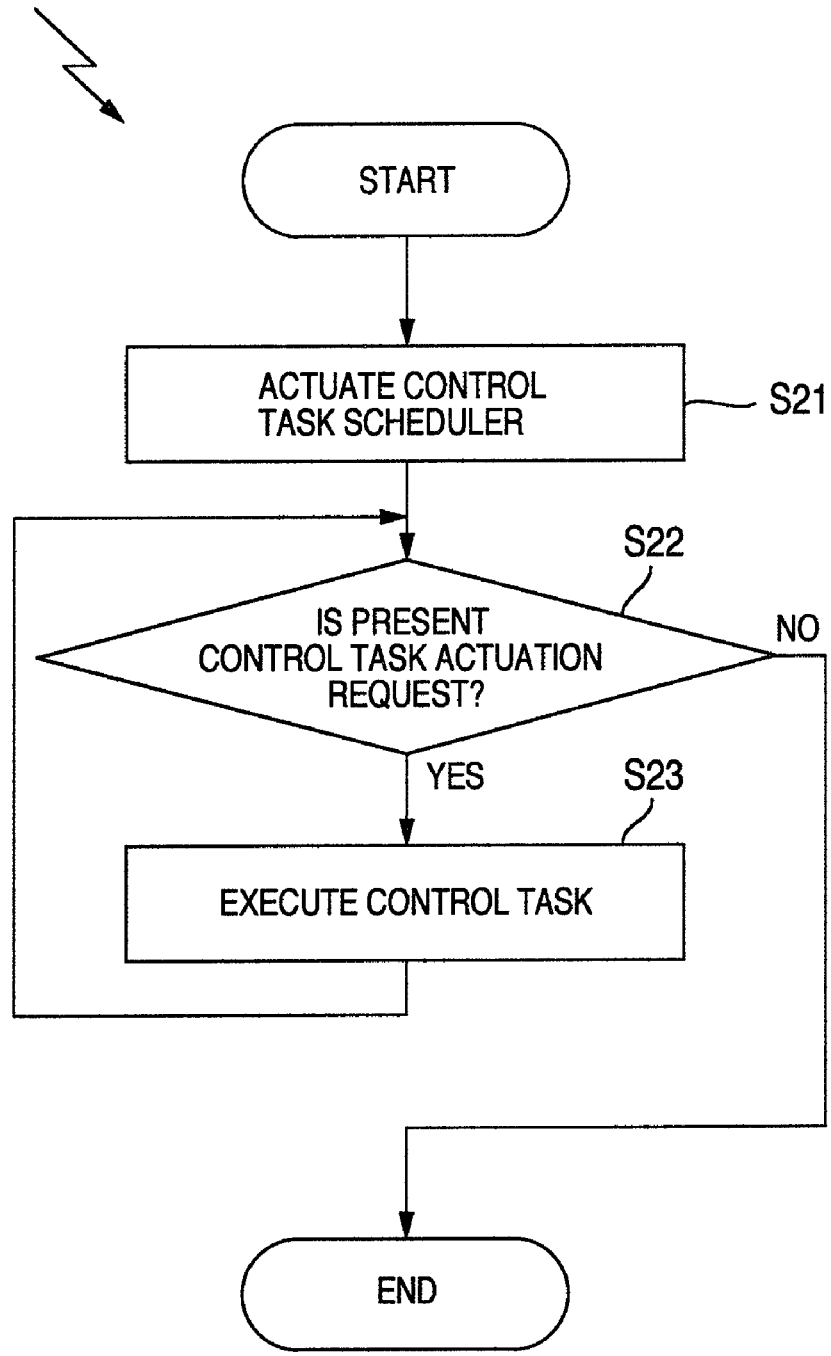
FIG. 4 is a flowchart showing a processing sequence on an interrupt occurrence caused by a control timer 24 in a software 5.

FIG. 4 is a flowchart showing a processing sequence indicating when the interrupt occurs by causing of the control timer 24 in the software 5. Referring to FIG. 4, when the interrupt occurs by causing of the control timer 24, the software 5 actuates the control task scheduler 66 shown in FIG. 1, at step S21. Subsequently, the software 5 judges that whether an activation request of the control task is present at a step S22.

If the actuation request of the control task is present at the step S22, the control task is executed at a step S23, and the processing returns to the step S22. The judgment and processing then repeat at the steps S22 and S23 until the actuation request of the control task becomes absent.

If the actuation request of the control task is absent at the step S22, the processing is terminated. That is, if the control task dispatcher 56 in FIG. 1 judges that the control application task to be actuated is absent, the control process part 54 is terminated.

The actuation process, at the step S21, of the foregoing control task scheduler 66 in FIG. 4 indicates that the processing proceeds to the control state of the control task dispatcher 56 at the step S3 from the control process starting state at the step S1 in FIG. 2.

If the processing judges that the control application task to be actuated is present at the step S22, the control task dispatcher 56 proceeds to execute the control application task. This state indicates that the processing proceeds to the process state of the control task at the step S4 from the processing of the control task dispatcher 56 at the step S3, in FIG. 2.

Thereafter, as shown in FIG. 2, the processing proceeds to three states: the running state of the control kernel service part 60 at the step S2; the running state of the control task dispatcher 56 at the step S3; and the running state of the control application tasks 66, 67-1, 67-2 at the step S4.

In the case of this embodiment, the control application task to be executed first is the control task scheduler 66 shown in FIG. 1B. The control task scheduler 66 has an equal relationship with the control tasks 67-1 to 67-n and applies a trigger to actuate these tasks.

The control task scheduler 66 shown in FIG. 1B issues the actuation request to the control kernel service part 60 in sequence of the control task 67-1 and control task 67-2, and this processing is then terminated.

After terminating the processing of the control task scheduler 66, the processing proceeds again to the control task dispatcher 56 to execute in sequence of the control tasks 67-1 and 67-2. The processing of the control tasks 67-1 to 67-n is determined so as to execute in a common period by the control task scheduler 66. The processing proceeds to the information process part 55 when the execution of all of the control application tasks (66, 67-1, 67-2) is terminated.

After that, when the interrupt occurs by causing of the information timer 25, the interrupt control unit 53 notifies the interrupt to the information process part 55. The information process part 55 then executes the information application task.

Figure 5:
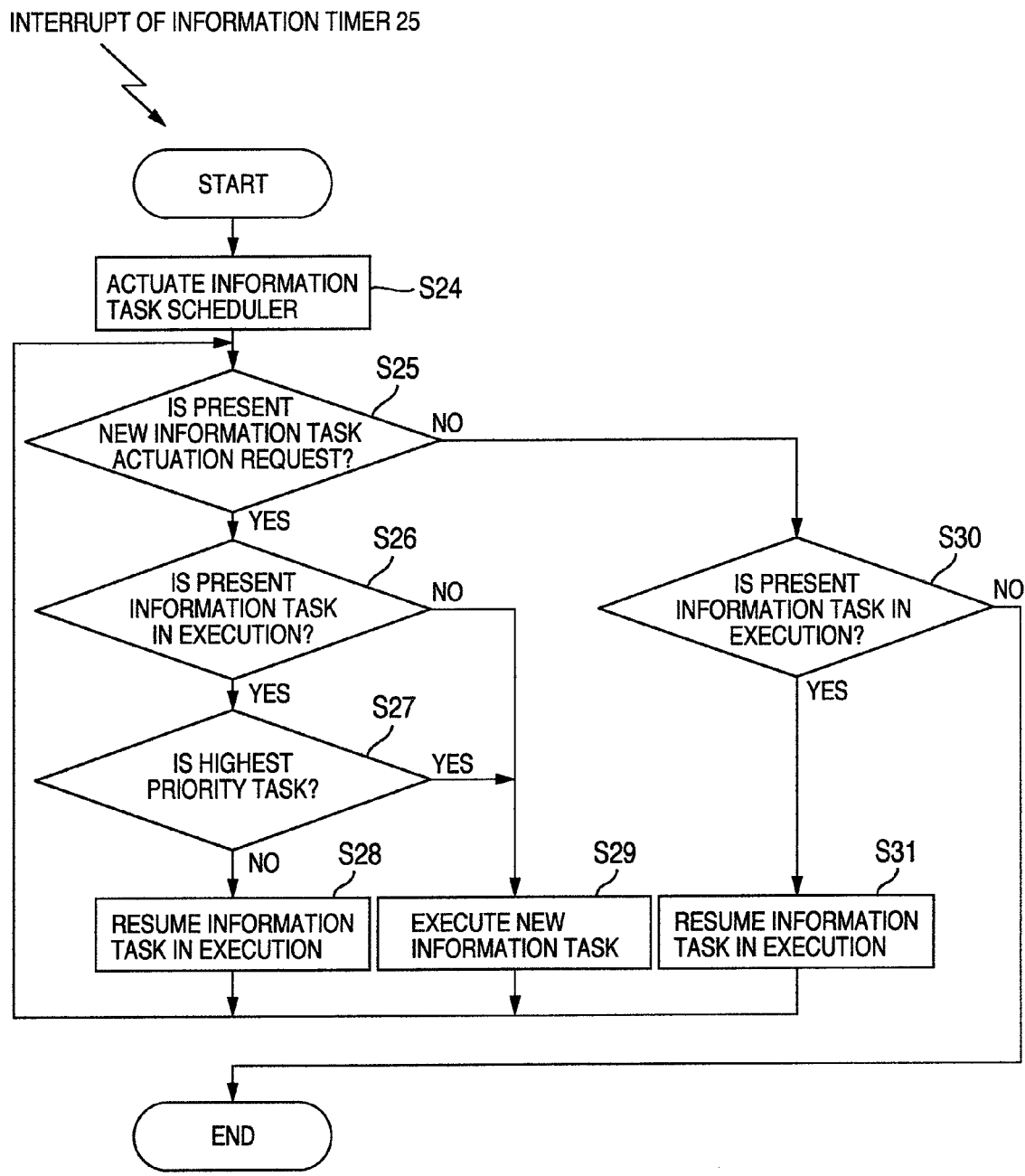
FIG. 5 is a flowchart showing a processing sequence on the interrupt occurrence caused by a control timer 25 in the software 5.

FIG. 5 is a flowchart for explaining a processing sequence of the information timer 25 in the software 5 on the interrupt occurrence.

Referring to FIG. 5, the software 5 in FIG. 1B actuates the information task scheduler when the interrupt occurs by causing of the information timer 25 at a step S24.

Next, the processing judges that whether the actuation request of a new information task is present at a step S25. If the information task dispatcher 61 shown in FIG. 1B judges that the new information task to be actuated is present at the step S25, subsequently, the processing judges that whether the information task in execution is present at a step S26. The new information task at the step S25 means the task requested at the step S24.

Next, if the software 5 in FIG. 1B judges that the information task in execution is present at the step S26, a priority of the new information task is compared with that of the information task in execution, and the processing judges that whether the information task has the highest priority at a step S27. The highest priority information task is then executed at a step S28 if it is present. The information task in execution at the step S26 means a task before subjecting to the interrupt.

If the information task in execution is absent at the step S26 and the highest priority information task is absent at the step S27, the new information task is executed at a step S29. That is, the software 5 executes either the information task in execution or the new information task.

If the software 5 judges that the information task in execution is not present at the step S26, the new information task is executed at the step S29. The processing returns again to the step S25 after terminating the processing at the steps S28 and S29.

If the software 5 judges that the actuation request of the new information application task is absent at the step S25, the processing checks the information application task in execution at a step S30. If the information application task in execution is present, it is executed at a step S31. The processing returns again to the step S25 when the processing at the step S31 is terminated.

If the information application task in execution is absent at the step S30, the processing is terminated. This state indicates that the processing proceeds to the idling state of the information task at the step S11 shown in FIG. 2.

The operation shown in FIG. 5 indicates that the information process part 55 proceeds to the information process starting state at the step S6 shown in FIG. 2.

Further, the actuation process, at the step S24, of the information task scheduler 68 in FIG. 5 indicates the process state such that the processing proceeds to the information task dispatcher 61 at the step S8 from the information process starting state at the step S6 shown in FIG. 2. Here, the processing proceeds to the process state of the information task dispatcher 61 at the step S8 from the information process starting state at the step S6 shown in FIG. 2 via the process state of the information kernel service part at the step S7.

Thereafter, as shown in FIG. 2, the processing proceeds to three states: the running state of the kernel service part 65 at the step S7; the running state of the information task dispatcher 61 at the step S8; and the running state of the information application tasks 68, 69-1 to 69-5 at the step S9.

In the case of this embodiment, the information application task to be executed first is the highest priority information task scheduler 68. The information task scheduler 68 provides a trigger to activate the information tasks 69-1 to 69-n.

The information task scheduler 68 shown in FIG. 1B issues an actuation request to the information kernel service part 65 for an information task that has adapted to the actuation period, among the information tasks 69-1 to 69-5, and this processing then terminates.

After terminating the information task scheduler 68, the processing again proceeds to the process state of the information task dispatcher 61, and the information tasks 69-1 to 69-5 that have been subjected to the actuation request are executed.

Figure 6:
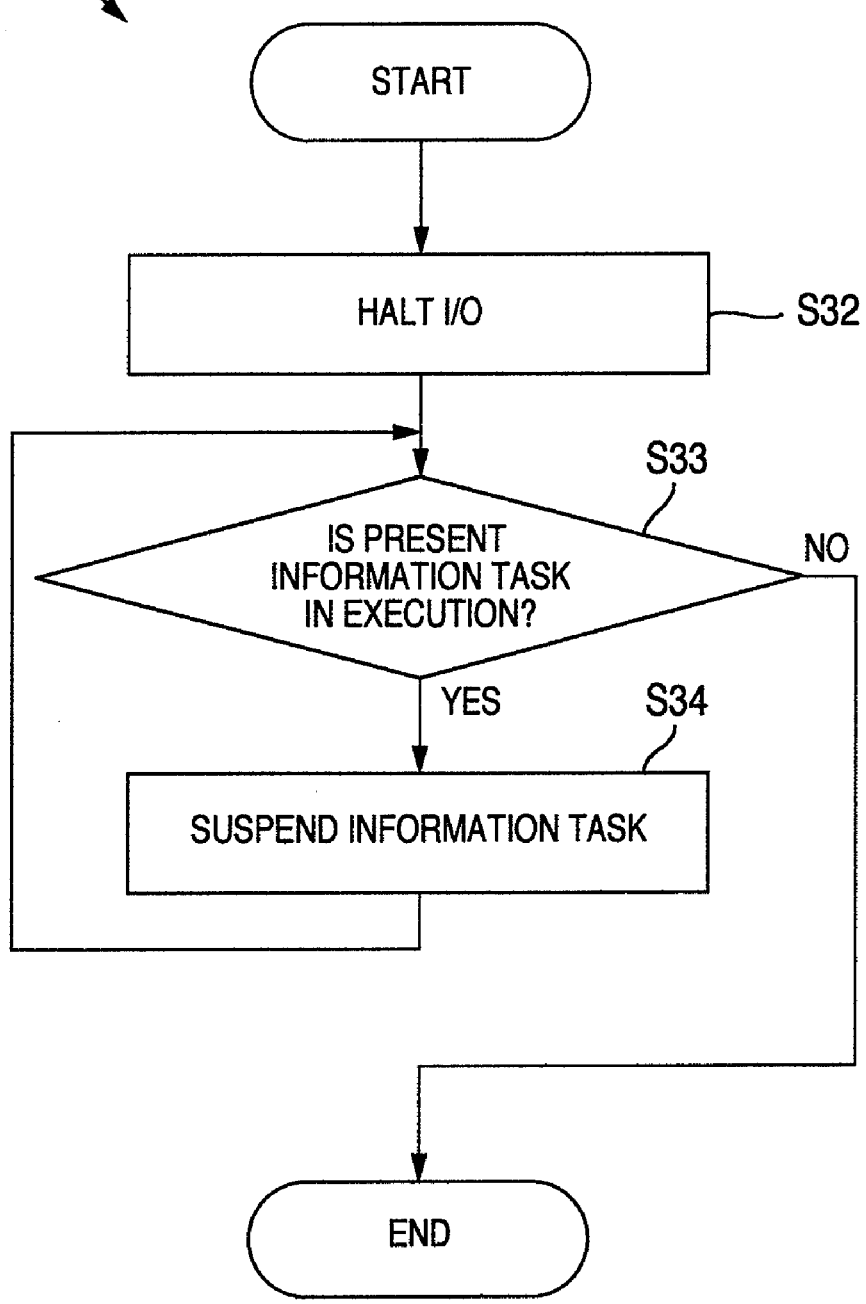
FIG. 6 is a flowchart showing a processing sequence on the interrupt occurrence caused by a control timer 23 in the software 5.

FIG. 6 is a flowchart for explaining a processing sequence of the control timer 23 in the software 5 on the interruption occurrence. Referring to FIG. 6, when the interrupt occurs by causing of the control timer 23, the software 5 makes halt the I/O at a step S32. Subsequently, the software 5 judges that whether the information task in execution is present at a step S33.

At the step S33, if the processing judges that the information task in execution is present, the information task is suspended at a step S34, and the processing returns to the step S33. The judgment and processing at the steps S33 and S34 are then repeated until the information task in execution becomes absent.

In this way, the processing that executes the halt process, at the step S32, of the information I/O in operation in FIG. 6 and judges that whether the information application task in presently operation is present at the step S33, indicates the state of the information task suspend, at the step S10 shown in FIG. 2.

If the information application task in operation is present, a suspension process of the information task is carried out at the step S34, and the processing is terminated if it is absent. In the case of this state, the information process part 55 proceeds to the information task idling state at the step S11 shown in FIG. 2.

That is, as shown in FIG. 2, the processing proceeds to the information task idling state at the step S11 from the halt state of the information I/O at the step S10 via the processing of the information kernel service part 65 at the step S7 and the processing of the information task dispatcher 61 at the step S8.

Specifically, a suspend request process to be suspended the information task at the step 34 in FIG. 6 is executed by issuing a command to the information kernel service part 65 from the software 5 and by carrying out the suspension process of the information application task by the information task dispatcher 61.

FIG. 7 is a flowchart for explaining a processing sequence when the processing proceeds to the information process part 55 from the control process part 54 in the software 5.

Referring to FIG. 7, the software 5 in FIG. 1B resumes the I/O operation at a step S35, and then judges that whether the information task in suspend is present at a step S36.

If the information task in suspend is present at the step S36, the information task is resumed at a step S37, and the processing returns to the step S36. The judgment and processing at the steps S36 and S37 repeat until the information task in suspend becomes absent.

At the step S36, the information application task in suspend that has been identified as being present is the information task as suspended at the step S34 in FIG. 6. Further, what the information task is resumed at the step S37 in FIG. 7 indicates the resumption process. Here, the resumption process resumes from the suspended task. Therefore, the suspend is carried out for every task.

That is, the software 5 executes to resume the information task for all of the information application tasks, and the processing proceeds to judge that whether the information task in execution is present at a step S38 if the information application task in suspend is absent.

Next, the software 5 judges that whether the information task in execution is present at a step S38. The information task in execution indicates a task that should have been executed if the resumption is absent at the step S37.

If the processing judges that the information application task in execution is present at the step S38, the software 5 checks the priority for the task at a step S39.

If the processing judges that the task is the highest priority task at the step S39, the information application task in execution is executed at a step S40, and the processing then returns to the step S38. If the processing judges that the highest priority task is absent at the step S39, it returns to the step S38 without action. The highest priority task means a task to be switched over in the highest priority.

If the execution of all of the information application tasks is executed and terminated, and the information task dispatcher 61 judges that the information application tasks 68, 69-1 to 69-5 to be executed is absent, the processing is terminated.

The operation shown in FIG. 7 indicates that the processing proceeds to the resuming state of the information I/O, at the step S5, by the information process part 55, if the actuation request of the control task shown in FIG. 2 is present. That is, the process of: the resumption process of the suspended I/O at the step S35; the processing of judging that whether the information application task in suspend is present at the step S36; and the resumption process of the information application task at the step S37, indicates that the information I/O at the step S5 shown in FIG. 2 is resumed, in FIG. 7.

Thereafter, as shown in FIG. 2, the processing proceeds to three states: the running state of the kernel service part 65 at the step S7; the running state of the information task dispatcher 61 at the step S8; and the running state of the information application tasks at the step S9, from the resuming state of the information I/O at the step S5.

In addition, the state of judging that the information application tasks 68, 69-1 to 69-5 to be executed is absent at the step S38, indicates that the processing proceeds to the idling state at the step S11 shown in FIG. 2.

Another Embodiment

Next, another embodiment of the invention will be described below.

This embodiment indicates an example of switching over, at every excitation of timer, the information process part 55 and control process part 54 by the time-sharing method.

Figure 8A:
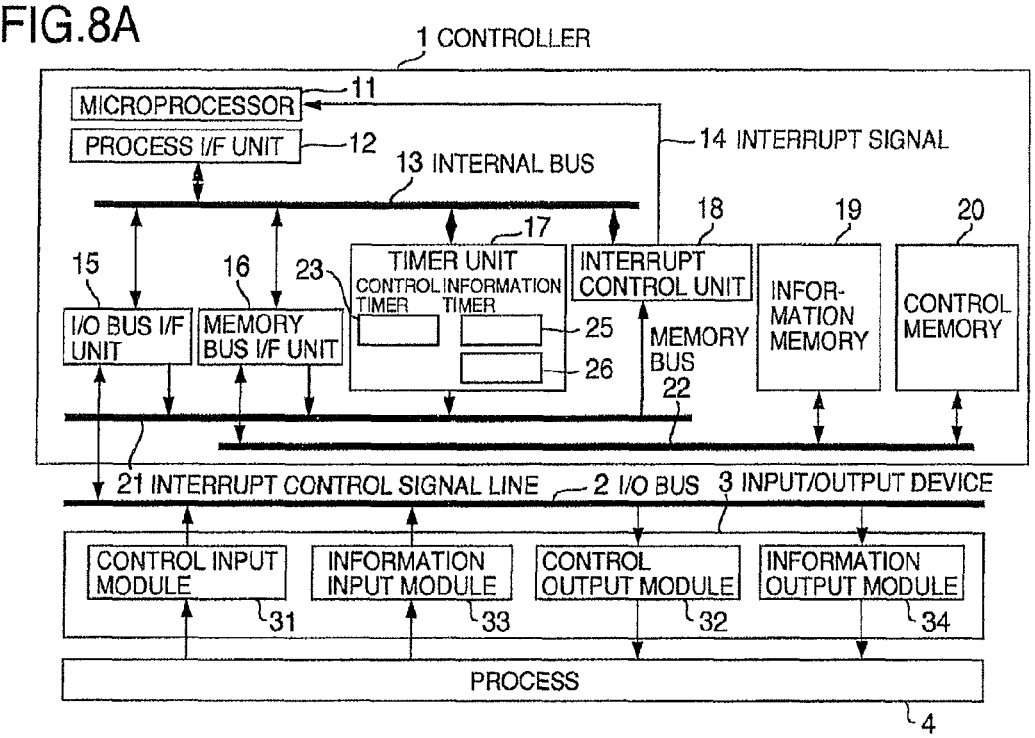
FIG. 8A is a hardware constitutional diagram showing a control apparatus in another embodiment of the invention.
Figure 8B:
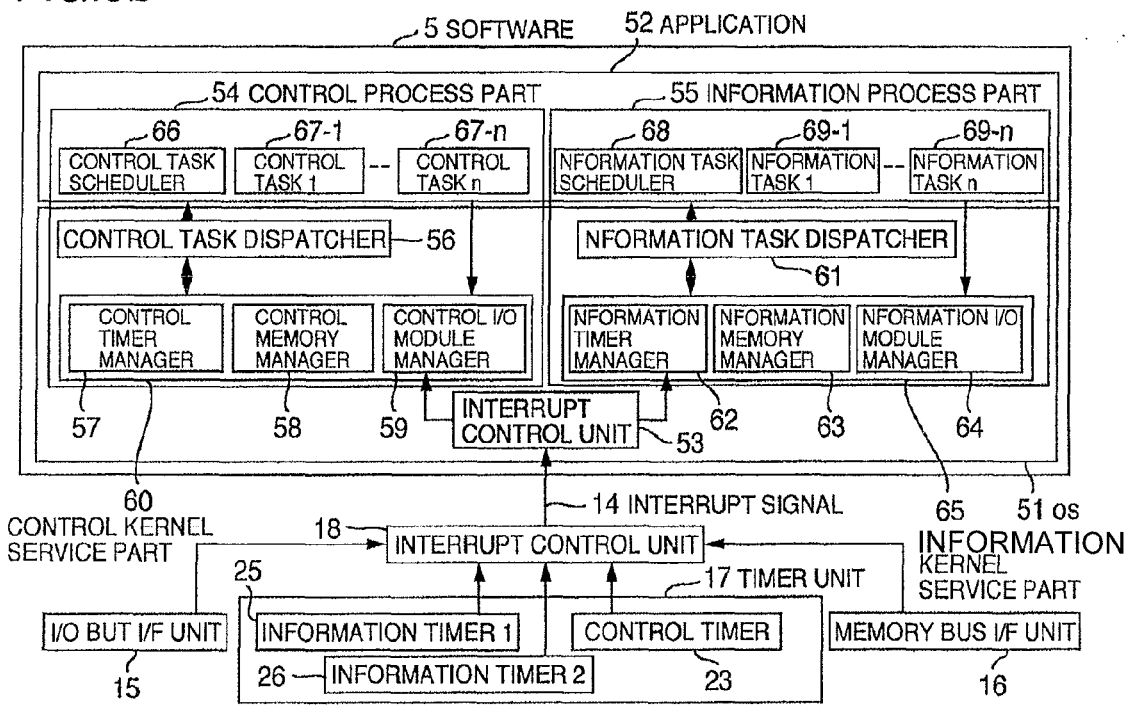
FIG. 8B is a software constitutional diagram showing the control apparatus in the another embodiment of the invention.

FIGS. 8A and 8B show another control apparatus. The same reference numerals corresponding to the same elements in FIGS. 1A and 1B are appended to FIGS. 8A and 8B, and description for the same elements will be omitted.

In the case of this embodiment, an information timer 26 is added to the timer unit 17 in place of the control timer 24, in contrast to the first embodiment in FIGS. 1A and 1B.

Further, unlike the first embodiment shown in FIG. 1, the control process part 54 and information process part 55 have an equal relationship with each other as a constitution, and the control process part 54 and information process part 55 are alternately switched over at every excitation of the control timer 23.

Figure 9:
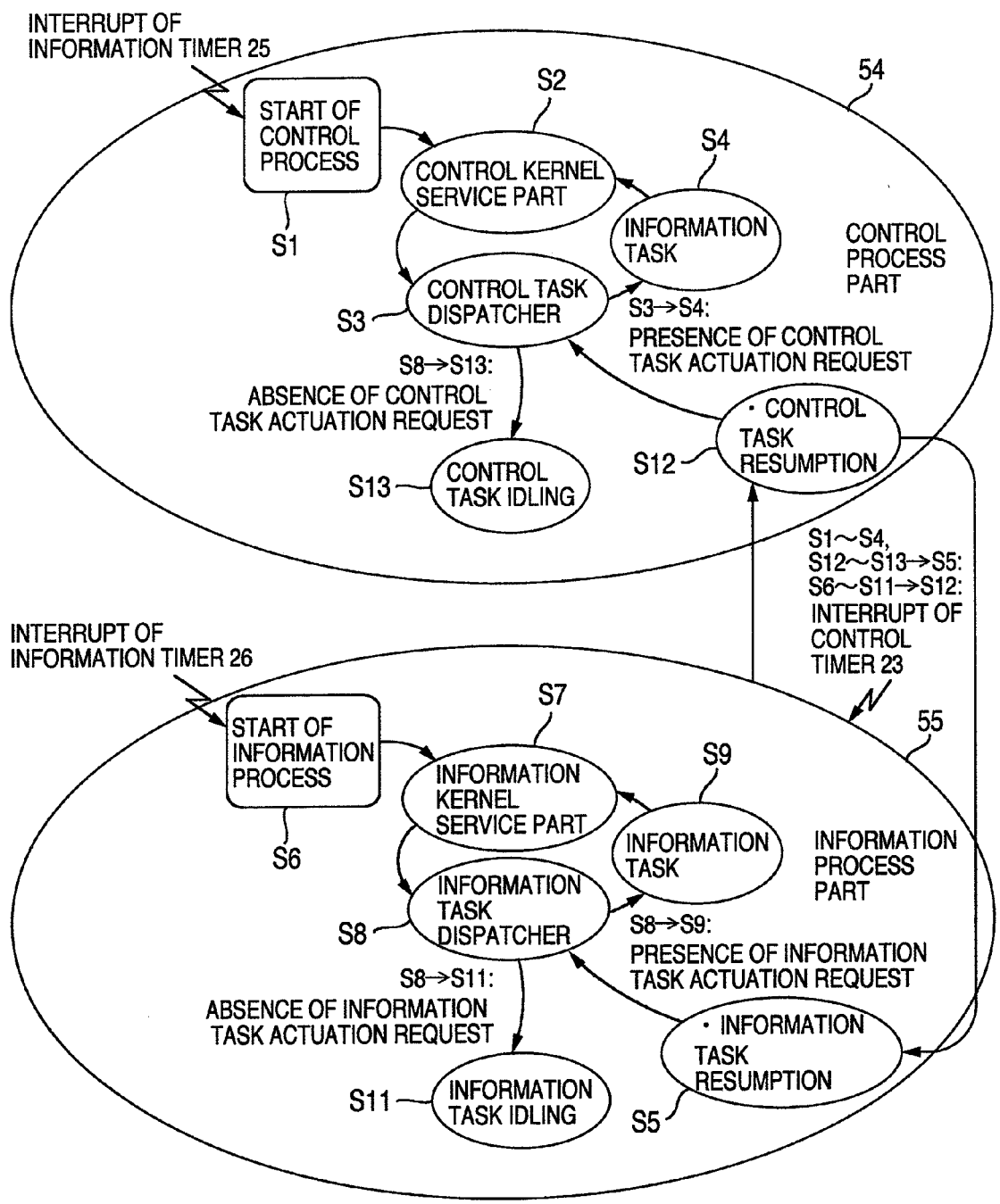
FIG. 9 is a state transition diagram showing the software in the another embodiment of the invention.
Figure 10:
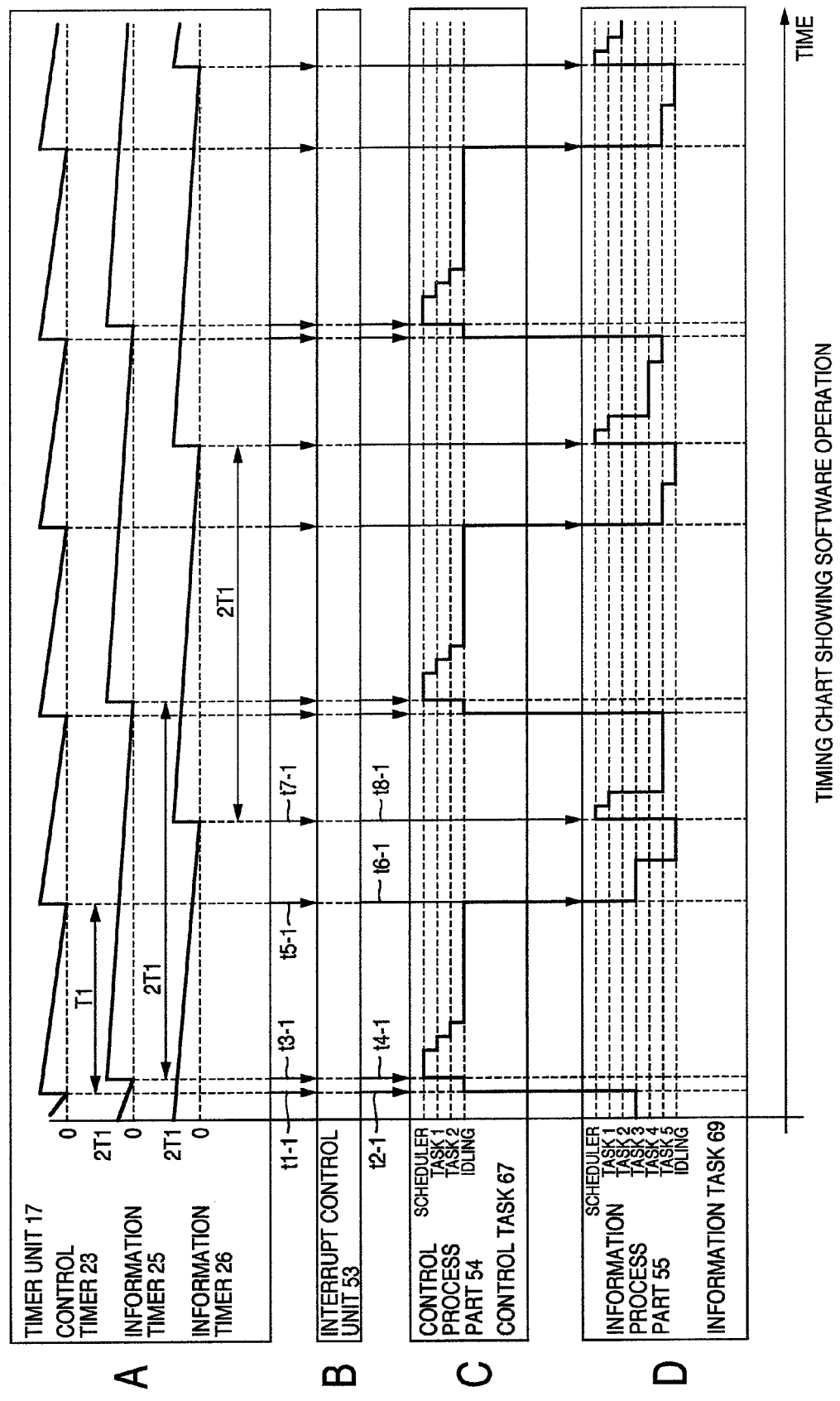
FIG. 10 is a timing chart showing an operation of the software in the another embodiment of the invention, in which "A" indicates an operation of the timer unit 17, "B" indicates an operation of the interrupt control unit 53, "C" indicates an operation of the control process part 54, and "D" indicates an operation of the information process part 55.

FIG. 9 is a state transition diagram and FIG. 10 is a timing chart, in another embodiment.

First, a description will be concerned with the state transition diagram in FIG. 9.

Referring to FIG. 9, states of a control task resumption at a step S12 and of a control task idling at a step S13, are added to the state of the control process part 54, compared with the embodiment shown in FIG. 2.

In the case of the first embodiment in FIG. 2, the processing is switched over to the information process part 55 when the processing of the control process part 54 is terminated. However, this embodiment is different in that the processing is remained in the idling state at the step S13, after terminating the processing of the control application task in the control process part 54.

The idling state at the step S13 in the control process part 54 has an equal relationship with the idling state at the step S11 in the information process part 55.

Further, when the processing of control process part 54 resumes by excitation of the control timer 23, this embodiment is different in that the state of the control task resumption at the step S12 is added thereto since the processing resumes the control application task that was suspended similarly to the information process part 55.

The state of the control task resumption at the step S12 in the control process part 54 has an equal relationship with the state of the information task resumption at the step S5 in the information process part 55.

The resumption process resumes from the suspended task. In addition, the suspend is carried out for every task.

Next, a description will be concerned with a timing chart in FIG. 10.

Referring to "A" in FIG. 10, the excitation of the control timer 23 occurs at every period T1, and the control process part 54 is alternately switched over with the information process part 55 by the time-sharing method.

The information timers 25 and 26 are excited at a period 2T1. The information timer 25 excites in execution of the control process part 54 as shown in "C" in FIG. 10, and the information timer 26 excites in execution of the information process part 55 as shown in "D" in FIG. 10. Therefore, the information timer 25 has the equal relationship with the information timer 26.

As shown in "A" in FIG. 10, when the interrupt occurs at time t1-1 by causing of the control timer 23, the interrupt control unit 53 notifies the interrupt to the information process part 55 at a time t2-1, as shown in "B" in FIG. 10.

As shown in "D" in FIG. 10, the information process part 55 suspends an information task 69-3. When the execution of task is suspended, the processing proceeds to the idling state of the control process part 54, as shown in "C" in FIG. 10.

In this state, the information process part 55 proceeds to the state at the step S13 shown in FIG. 9. The state at the step S13 in FIG. 9 indicates the state of the control task idling.

As shown in "D" in FIG. 10, after the information task 69-3 is suspended at the time t2-1, the interrupt occurs by causing of the information timer 25 at a time t3-1, as shown in "A" in FIG. 10. Here, the interrupt control unit 53 notifies the interrupt to the control process part 54 at a time t4-1.

In the case of this state, the information process part 54 proceeds to the control process starting state at the step S1 shown in FIG. 9.

Alternatively, the control process part 54 proceeds to the control task resuming state at the step S12, as shown in FIG. 9, when a previously suspended control task is resumed.

That is, as shown in FIG. 9, the control process part 54 proceeds to the state of the control task resumption at the step S12.

As shown in "C" in FIG. 10, the control process part 54 then executes consecutively the control task scheduler 66 and control tasks 67-1 to 67-2 at the time t4-1, by the interrupt caused by the information timer 25.

As shown in "A" in FIG. 10, when the interrupt occurs by causing of the control timer 23 at a time t5-1, the interrupt control unit 53 notifies the interrupt to the information process part 55 at a time t6-1, as shown in "D" in FIG. 3. The information process part 55 then resumes the suspended information task 69-3, and terminates this processing.

This state indicates the information task resumption at the step S5, as shown in FIG. 9.

When the execution of the information task 69-3 is terminated, the processing proceeds to the idling state. This state is the state of the information task idling at the step S11, as shown in FIG. 9.

Thereafter, as shown in "A" in FIG. 10, when the interrupt occurs by causing of the information timer 26 at a time t7-1, the interrupt control unit 53 notifies the interrupt to the information process part 55 at a time t8-1, as shown in "D" in FIG. 3. In the case of this state, the information process part 55 proceeds to the information process starting state at the step S6, as shown in FIG. 9.

Consequently, the execution is carried out for the information task scheduler 68 and information tasks 69-1 and 69-5, as shown in "D" in FIG. 10. When the execution is terminated for all of the information application tasks, the processing proceeds to the idling state of the information process part 54, as shown in "C" in FIG. 10. In the case of this state, the information process part 55 proceeds to the state at the step S13 shown in FIG. 9. The state at the step S13 in FIG. 9 is the state of the control task idling.

As shown in "A" in FIG. 10, the interrupt caused by the control timer 23 occurs at every elapse of T1, and the interrupt caused by the information timers 25 and 26 occurs at every elapse of 2T1. The switchover operation is executed repeatedly between the information process part 55 and control process part 54 by the time-sharing method, as shown in "D" and "C" in FIG. 10.

In also the case of the another embodiment shown in FIGS. 8A and 8B, the processing sequence, shown in FIG. 5, of the control process part 54 is executed on the interrupt occurrence caused by the information timer 25, similarly to the embodiment shown in FIGS. 1A and 1B. Likewise, the processing sequence in FIG. 7 is also executed by such that the processing proceeds to the information process part 55 from the control process part 54.

Figure 11:
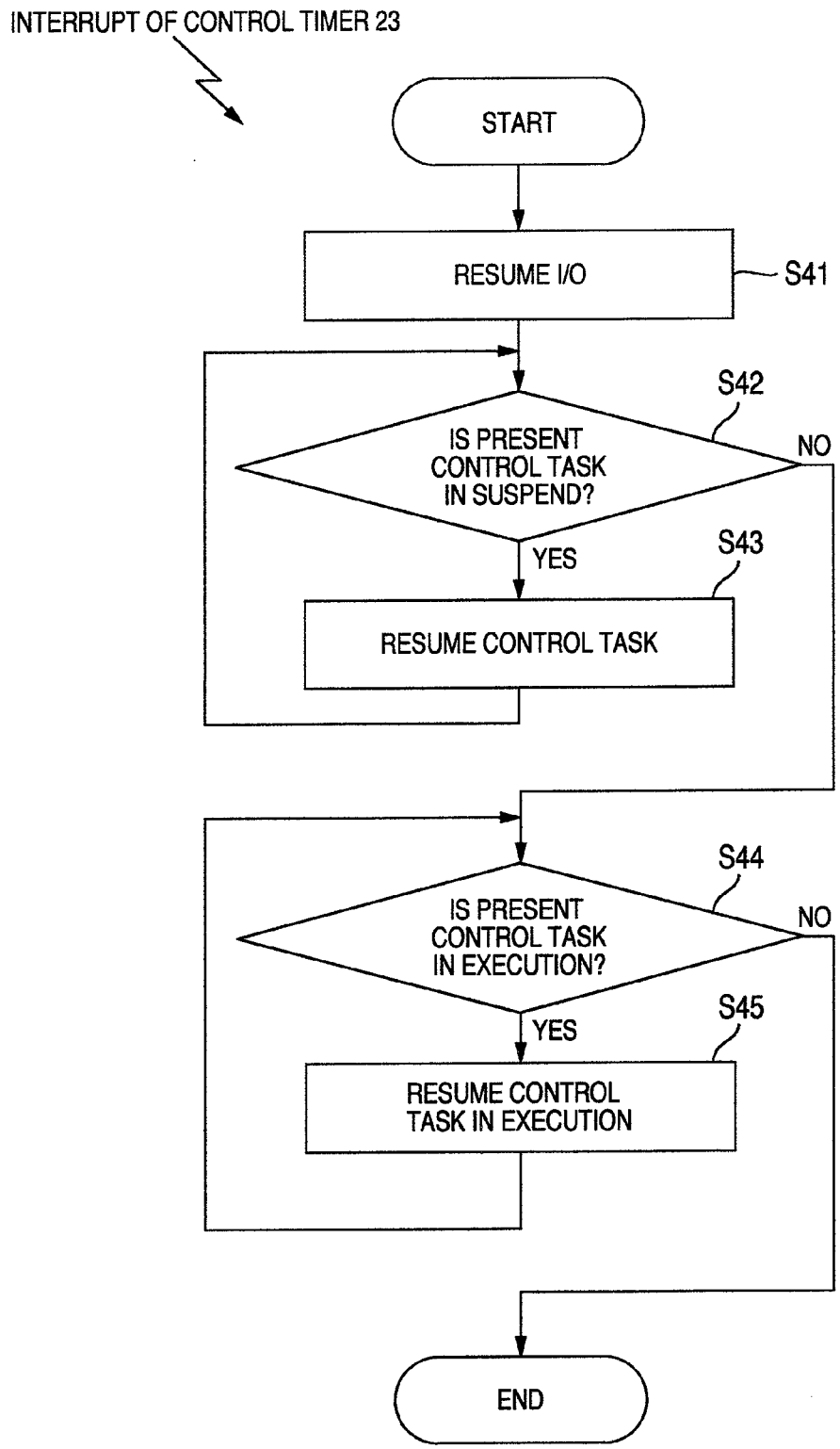
FIG. 11 is a flowchart showing a processing sequence on proceeding to the control process part 54 from the information process part 55 in the software 5 in the another embodiment of the invention.

FIG. 11 is a flowchart showing a processing sequence of proceeding to the control process part 54 from the information process part 55 in the software 5, in the another embodiment shown in FIGS. 8A and 8B.

Specifically, FIG. 11 indicates the processing sequence of the control process part 55 that starts from the state of the control task resumption at the step S12 in FIG. 9 on the excitation of the control timer 23. The following description will be concerned with FIG. 11 that is added to the embodiment shown in FIGS. 1A and 1B.

Referring to FIG. 11, the software 5 resumes the I/O at a step S41. Subsequently, the software 5 judges that whether the control task in suspend is present at a step S42.

If the control task in suspend is present at the step S42, the control task is resumed at a step S43, and the processing returns to the step S42. The judgment and processing at the steps S42 and S43 repeat until the control task in suspend becomes absent.

The software 5 executes to resume the control task for all of the control application tasks at the step S43, and the processing proceeds to a step S44 if it judges that the control application task in suspend is absent at the step S42.

Here, the software 5 judges that whether the control task in execution is present at the step S44. The control task in execution means the task that should have been executed if the resumption is absent at the step S43.

If the control task in suspend is absent at the step S42, the processing judges that whether the control task in execution is present at the step S44.

If the processing judges that the control task in execution is present at the step S44, the resumption of the control application task in execution is executed at a step S45, and the processing then returns to the step S44. The resumption of the control application task in execution is repeated until the control task in execution becomes absent, and this process is terminated.

The resumption of the control task at the foregoing step S43 indicates the state of the control task resumption at the step S12 shown in FIG. 9. That is, this processing is the state indicating that the resumption process, at the step S41, of the suspended I/O is executed and the resumption process at the step S43 is executed, by the software 5 shown in FIG. 8, if the suspended control task is present at the step S42.

Thereafter, as shown in FIG. 9, the processing proceeds to three states: the running state of the kernel service part 60 at the step S2; the running state of the control task dispatcher 56 at the step S3; and the running state of the control application task at the step S4.

If the processing judges that all of the control application tasks are executed and terminated and the control application tasks 66, 67-1 to 67-2 in execution are absent by the control task dispatcher 56, the processing is terminated. This state indicates that the processing proceeds to the state of the control task idling at the step S13 shown in FIG. 9.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus comprising:
   an input-output device configured to receive an input signal from a process for requesting a processing;
   a controller configured to carry out an control operation in accordance with the signal from the input-output device and to output a result of the control operation to the process via the input-output device, and has a timer unit configured to be excited at a constant period;
   a hardware part connected between the input-output device and the controller, and constituted by an I/O bus as a communication path of a control signal and data transmitted between the input-output device and the controller; and
   a software part, including an operating system part, configured to be executed in the controller, wherein the software part includes:
      an information process part configured to execute an information processing,
      a control process part configured to execute a control processing,
      a switchover part configured to switch between the information process part and the control process part; and
   wherein the operating system part includes:
      an information kernel service part configured to control the information process part, and to execute at least one information task, and
      a control kernel service part configured to control the control process part, and to execute at least one control task;
   wherein the switchover part is configured to suspend an execution of the information process part to execute the control process part in priority at every excitation of the timer unit;
   wherein the information process part and the control process part are configured to be switched over such that the execution of the information process part is resumed when the execution of the control process part is terminated;
   wherein the operating system part of the software part is configured to halt the information process part at each excitation of the timer and thereafter switch to the control process part.

2. The control apparatus according to claim 1, wherein the switchover part is configured to switch between the information process part and the control process part at every excitation of the timer unit by a time-sharing method.

3. The control apparatus according to claim 1, wherein the controller includes a prediction timer configured to excite before a constant time period given by the timer unit, and
   the switchover part is configured to notify a prediction for a switchover to the information process part at every excitation of the prediction timer.

4. The control apparatus according to claim 1, wherein the controller includes an information memory used by the information process part and a control memory used by the control process part, and the information process part and the control process part are configured to not give effect of a processing to one another.

5. The control apparatus according to claim 1, wherein the input-output device includes an information input-output device used by the information process part and control input-output devices used by the control process part, and the information process part and the control process part are configured to not give effect of a processing to one another.

6. The control apparatus according to claim 1, wherein the control process part includes a control task and a control task scheduler configured to provide a trigger to actuate the control task,
the information process part includes an information task and an information task scheduler configured to provide a trigger to actuate the information task, and
the software part is configured to prohibit an interrupt of the information task to the control task in execution.

7. The control apparatus according to claim 6, wherein the software part includes an interrupt control unit configured to manage the interrupts of the control task and the information task, and
the interrupt control unit is configured to mask the interrupt of the information task and permit an interrupt of the control task against the information task.

8. The control apparatus according to claim 6, wherein the control process part includes a control task dispatcher configured to switch between a plurality of control tasks, and
the control task dispatcher is configured to prohibit an preemption between control tasks.

9. The control apparatus according to claim 1, wherein a resumption process provided by the information process part is configured to be executed at every task from a suspended information task, after the information task in execution is suspended to execute the control task in priority.

10. A control method of a process input-output device comprising the steps of:
receiving an input signal from a process that requests a processing and outputting a control signal to the process by an input-output device;
executing a control operation in accordance with a signal from the input-output device and outputting a result of the control operation to the process via the input-output device, by a controller with an operating system;
executing an information process and a control process by an operating system part in the controller, wherein the operating system includes:
an information kernel service part configured to control the information process, and to execute at least one information task, and
a control kernel service part configured to control the control process, and to execute at least one control task; and
suspending an execution of an information process part to execute a control process part in priority at every excitation of a timer unit and switching over to the information process part to resume an execution of the information process part when the execution of the control process part is terminated, by using a switchover part.

11. A control apparatus comprising:
an input-output device configured to receive an input signal from a process for requesting a processing;
a controller configured to carry out an control operation in accordance with the signal from the input-output device and to output a result of the control operation to the process via the input-output device, and has a timer unit configured to be excited by a constant period;
a hardware part connected between the input-output device and the controller, and constituted by an I/O bus as a communication path of a control signal and data transmitted between the input-output device and the controller; and
a software part, including an operating system, configured to be executed in the controller, wherein the software part includes:
an information process part configured to execute an information processing,
a control process part configured to execute a control processing, and configured such that when the execution of the control process part is terminated, the information process part and the control process part are switched over such that the execution of the information process part is resumed,
a switchover part configured to switch between the information process part and the control process part, and to suspend an execution of the information process part to execute the control process part in priority at every excitation of the timer unit, and
wherein the operating system part includes:
an information kernel service part configured to control the information process part, and to execute at least one information task, and
a control kernel service part configured to control the control process part, and to execute at least one control task; and
wherein the operating system part is configured to halt the information process part at each excitation of the timer and thereafter switch to the control process part.

12. The control apparatus according to claim 11, wherein the switchover part is configured to switch between the information process part and the control process part at every excitation of the timer unit by a time-sharing method.

13. The control apparatus according to claim 11, wherein the controller includes a prediction timer configured to excite before a constant time period given by the timer unit, and
the switchover part is configured to notify a prediction for a switchover to the information process part at every excitation of the prediction timer.

14. The control apparatus according to claim 11, wherein the controller includes an information memory used by the information process part and a control memory used by the control process part, and the information process part and the control process part are configured to not give effect of a processing to one another.

15. The control apparatus according to claim 11, wherein the input-output device includes an information input-output device used by the information process part and control input-output devices used by the control process part, and the information process part and the control process part are configured to not give effect of a processing to one another.

16. The control apparatus according to claim 11, wherein the control process part includes a control task and a control task scheduler configured to provide a trigger to actuate the control task,
the information process part includes an information task and an information task scheduler configured to provide a trigger to actuate the information task, and
the software part is configured to prohibit an interrupt of the information task to the control task in execution.

17. The control apparatus according to claim 11, wherein the software part includes an interrupt control unit configured to manage the interrupts of the control task and the information task, and the interrupt control unit is configured to mask the interrupt of the information task and permit an interrupt of the control task against the information task.

18. The control apparatus according to claim 11, wherein the control process part includes a control task dispatcher configured to switch between the control task, and the control task dispatcher is configured to prohibit an preemption between the control tasks.

19. The control apparatus according to claim 11, wherein a resumption process provided by the information process part is configured to be executed at every task from a suspended information task, after the information task in execution is suspended to execute the control task in priority.

* * * * *